July 5, 1960

J. W. OXBERRY 2,943,535

COMBINED CAMERA AND PROJECTOR

Filed Jan. 16, 1958

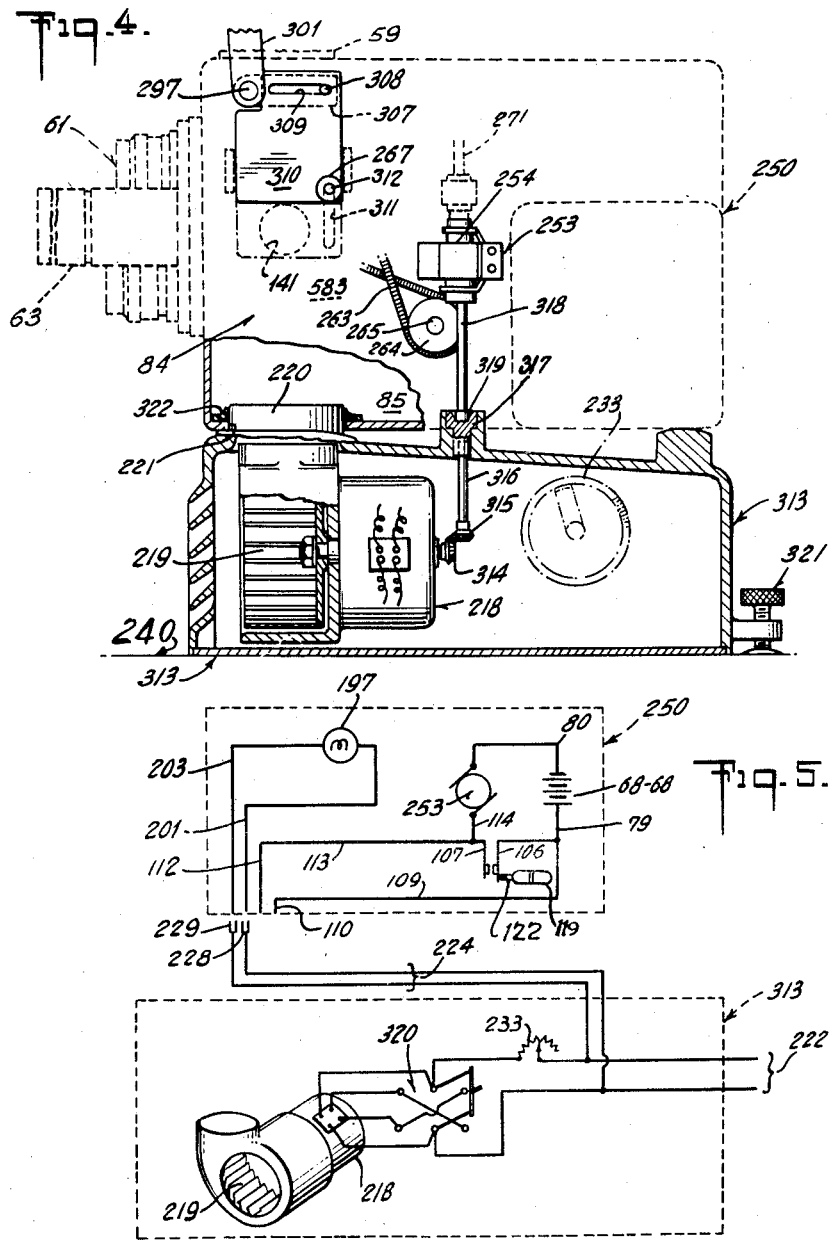

July 5, 1960  J. W. OXBERRY  2,943,535
COMBINED CAMERA AND PROJECTOR
Filed Jan. 16, 1958  7 Sheets-Sheet 4

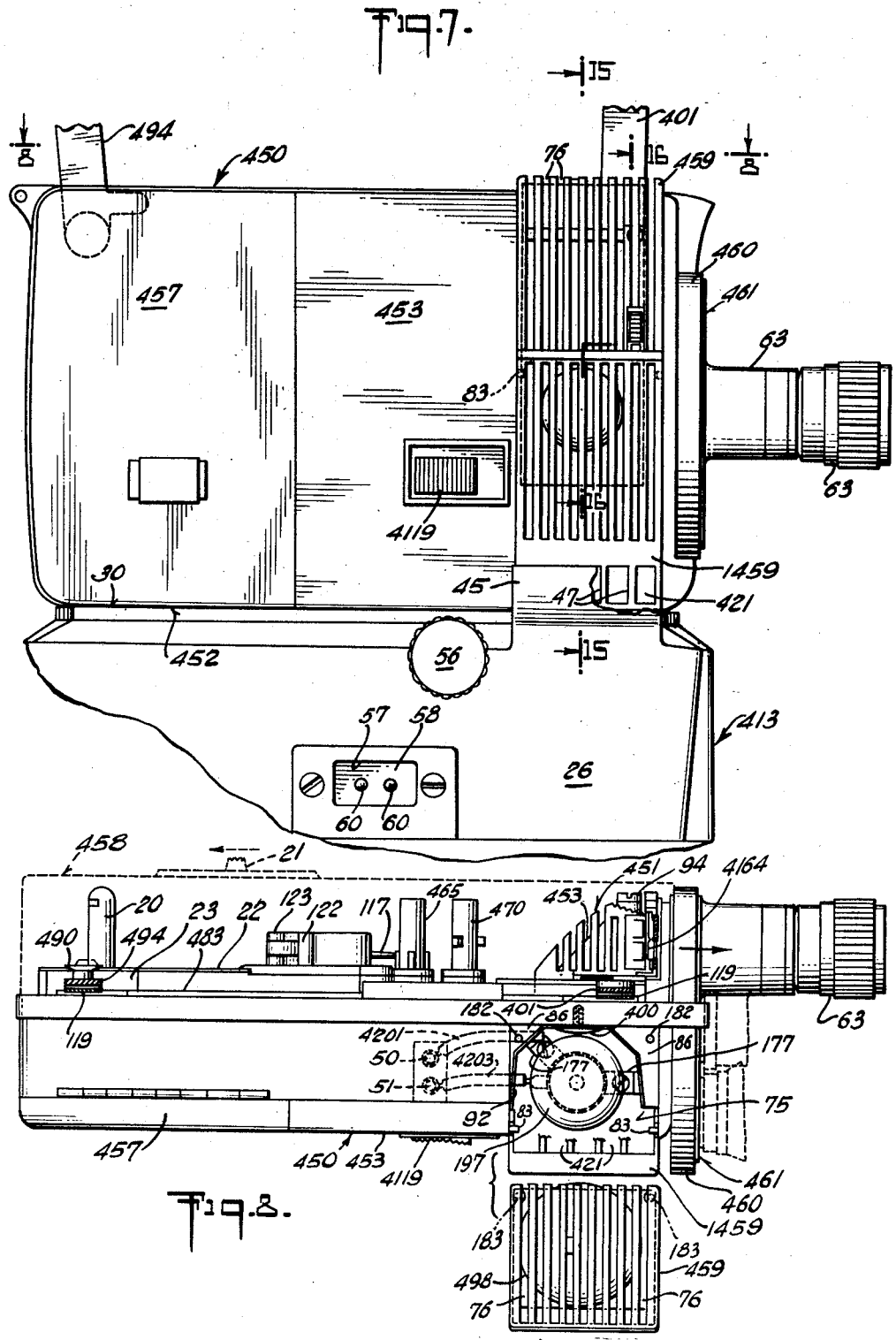

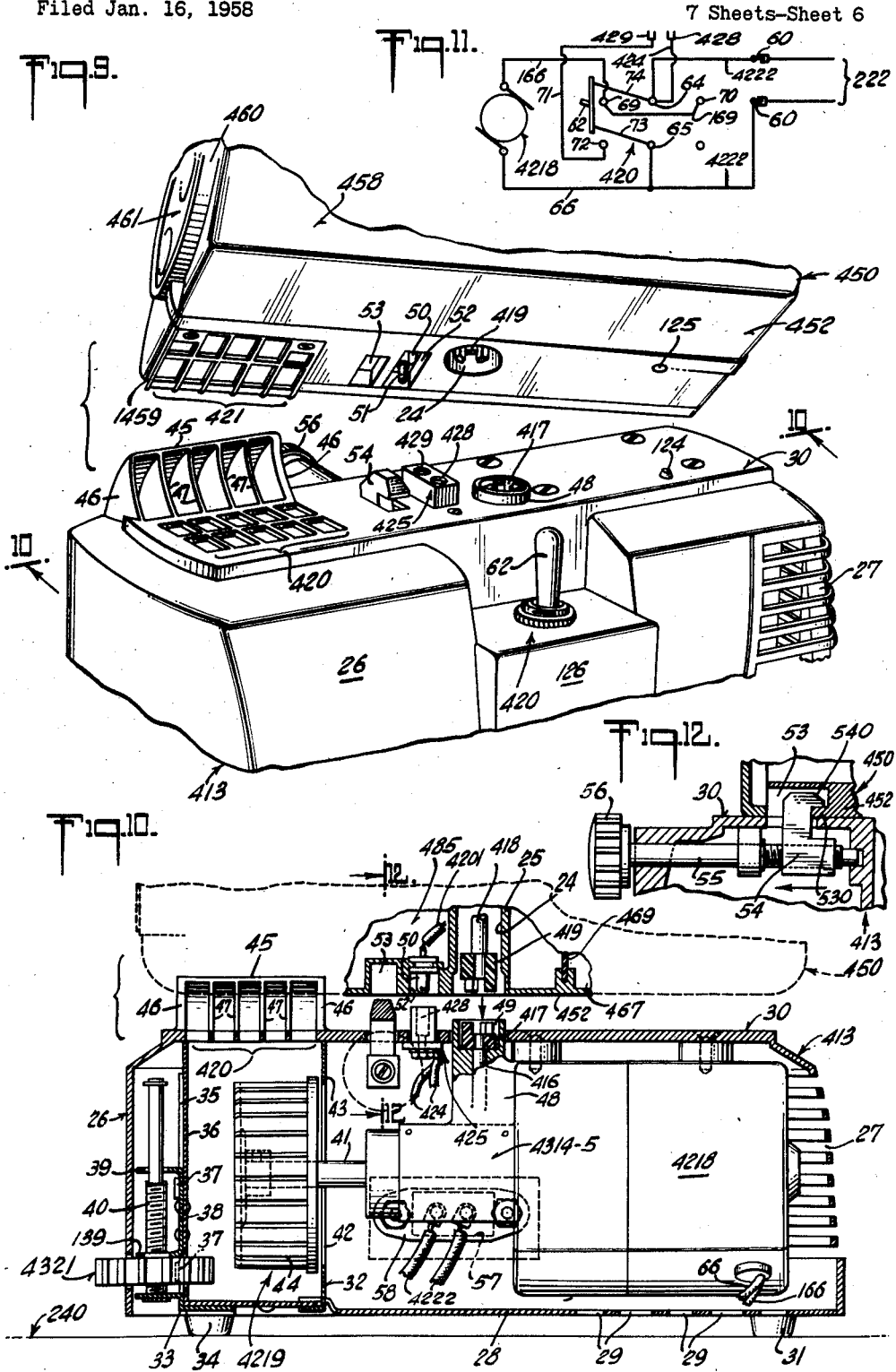

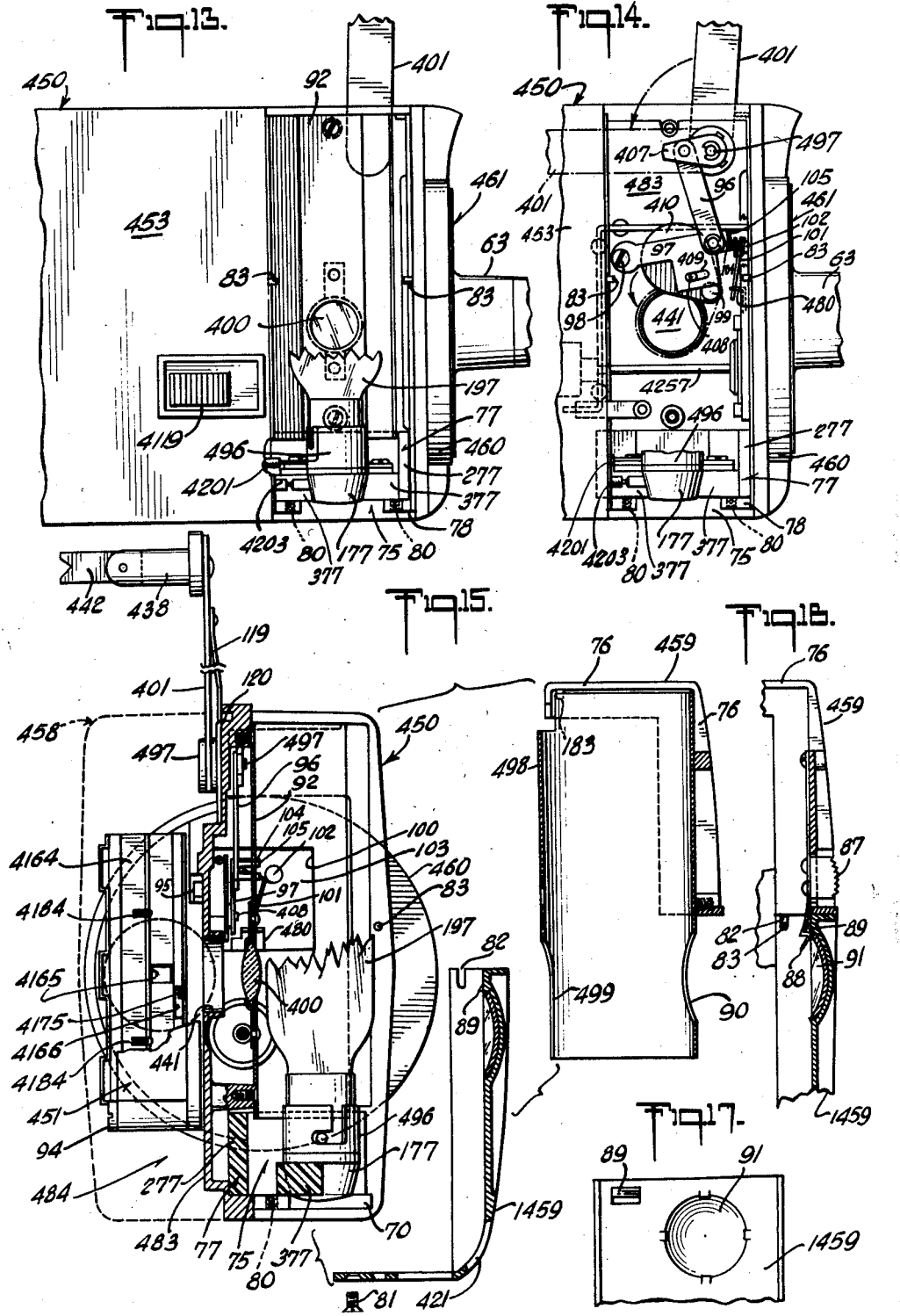

United States Patent Office 2,943,535
Patented July 5, 1960

2,943,535
COMBINED CAMERA AND PROJECTOR

John W. Oxberry, New Rochelle, N.Y., assignor, by direct and mesne assignments, of one-half to A. Kip Livingston, West Hempstead, N.Y., and one-half to Longines-Wittnauer Watch Co., Inc., New York, N.Y., a corporation of New York Filed Jan. 16, 1958, Ser. No. 709,248

5 Claims. (Cl. 88—17)

The present invention relates to apparatus which may be used both to take moving pictures and to project them and, more particularly, to an electrically-operated motion picture camera which may be converted by addition of accessories into an electrically-operated projector, and the present application is a continuation-in-part of my application Serial No. 405,543, filed January 22, 1954.

A general object of the invention is to provide a self-contained camera unit carrying its own source of electrical power for running it in the taking of moving pictures and associated projector parts to employ with the camera mechanism for ready and efficient conversion to a projector when the camera unit is mounted upon a projector base carrying the remainder of the projector mechanism including another source of electrical power, the camera effectively containing parts employed for both operations.

A more specific object of the present invention is to provide efficient embodiments of such apparatus characterized by a D.C. battery-operated camera unit for taking effectively half-width pictures successively upon the two marginal halves of unexposed double-width film traversing a light path, and by a household A.C. electrical power-operated accessory projector base unit readily attachable to the camera unit for projecting efficiently the half-width pictures from a developed single-width film along a path which includes the camera light path; efficient means being employed readily to connect the A.C. power source in the base unit to the camera unit mechanism for use of parts of the latter in projecting pictures, and to connect the energizing circuit of the A.C. power source to a projector light in the camera unit.

A further object is to provide such camera and projector base units in structural forms permitting ready mechanical drive, electrical and cooling air connections therebetween when the camera unit is mounted upon the base unit together to serve as a projector device.

An additional object of the invention is to provide embodiments of the invention which are readily constructed and assembled in an economical manner and which are efficiently operated in simple ways by those of little or no skill effectively to take and project good pictures of the "home movies" type.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

Fig. 4 is a side elevational view of the projector assembly of Fig. 1, with parts in section and others broken away and indicated in dotted lines, with a phantom showing of certain internal mechanism of the camera-projector apparatus;

Fig. 5 is a schematic diagram of the electrical circuits of the camera unit and projector assembly of Figs. 1 to 4 inclusive;

Fig. 7 is a right side elevational view, with parts broken away, of the projector assembly shown in Fig. 6;

Fig. 8 is a sectional view taken substantially on lines 8—8 of Fig. 7, showing the camera unit in plan view and with a portion of the projector light housing removed;

Fig. 9 is an exploded perspective, with parts broken away, of the bottom portion of the camera unit and top portion of the projector base unit in relative positions of manual movement of the former toward the latter for mount thereon;

Fig. 10 is a longitudinal vertical section of the projector base unit and a phantom view of the camera unit of Fig. 9, with parts broken away, showing closer approach to the former of the latter in the manual assembly thereof;

Fig. 11 is a schematic wiring diagram of the A.C electrical circuit of the projector base unit shown in Figs. 6 to 10 inclusive;

Fig. 12 is a fragmentary section, with parts broken away, taken substantially on line 12—12 of Fig. 10 but showing locking means on the units engaged to hold them together;

Fig. 13 is a right side elevational view, with parts removed and broken away, of the part of the camera unit which houses the projector light;

Fig. 14 is a view similar to Fig. 13 showing blind mechanism therein for the projector light rays passage as revealed by removal of certain projector light housing parts;

Fig. 15 is an exploded transverse sectional view, with parts broken away, taken substantially on lines 15—15 of Fig. 7, showing certain parts by dotted lines;

Fig. 16 is a fragmentary sectional view taken substantially on line 16—16 of Fig. 7; and Fig. 17 is an inside elevational view, with parts broken away, of the light reflector and its mount which serves as the lower half of the outside cover wall of the jector light housing.

Figure 1:
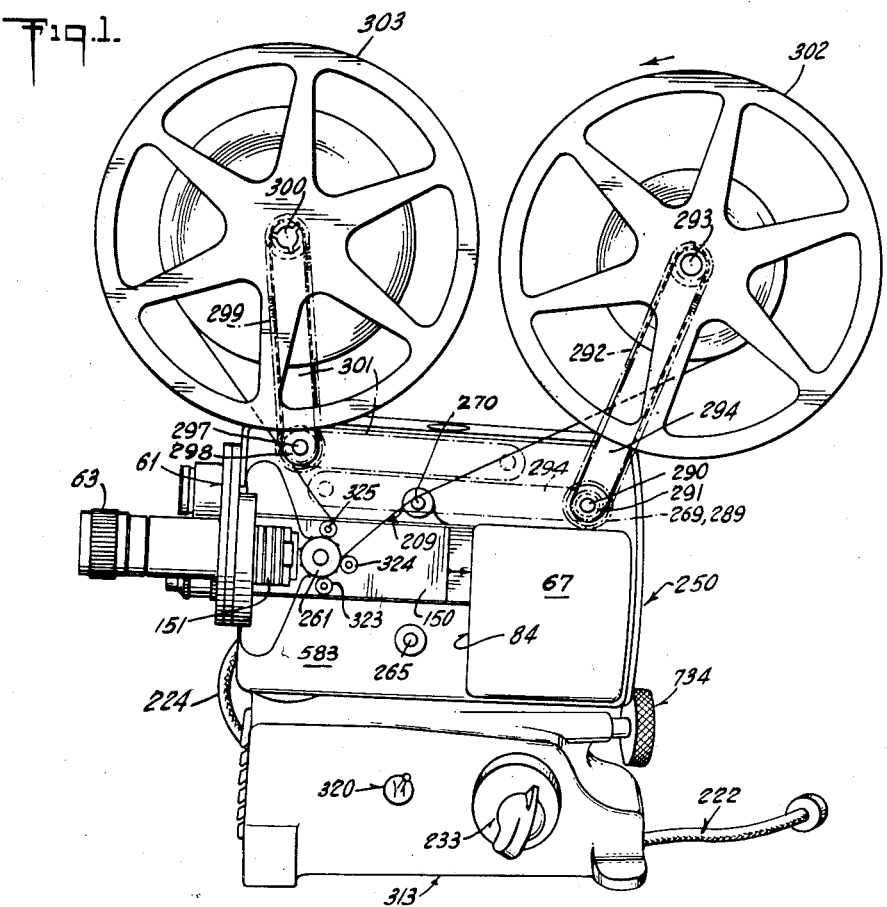
Fig. 1 is a left side elevational view to a reduced scale of one embodiment of the motion picture camera-projector apparatus of the present invention as conditioned for projector operation with the camera unit mounted upon the projector base unit.

Prior to the present invention, attempts have been made to incorporate in a single device mechanism which, with or without associated devices, could be employed both in the taking and projecting of pictures and, more particularly, motion pictures. Attempts have also been made to effect certain operations of such devices by electrical means. Also, some of such devices have attempted to employ common means in the optical systems designed for the alternate uses of camera and projector operation. However, most of such attempts have been unsuccessful from a practical point of view and prior inventors have failed to devise a marketable apparatus which could be efficiently employed for both operations, particularly with the use of double-width unexposed film for camera operation and for projector operation single-width film resulting from splitting longitudinally the double-width film after being developed. These and other prior art problems have been effectively solved or practically eliminated by the combined camera-projector apparatus and associated mechanisms of the present invention and the embodiments thereof illustrated by way of example in the drawings.

Figure 2:
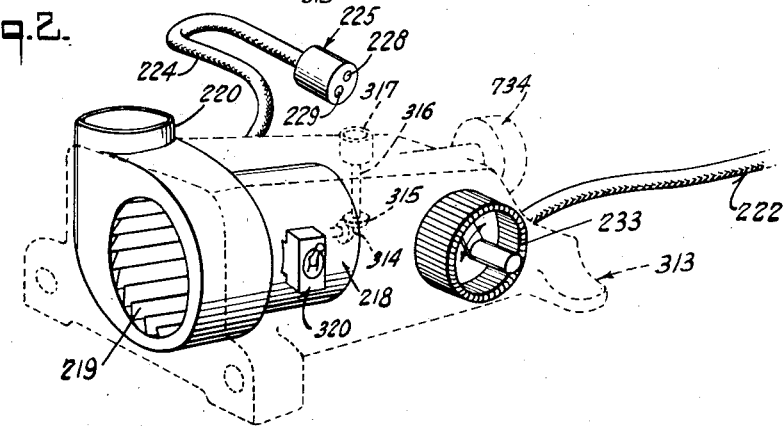
Fig. 2 is a phantom perspective of the projector base unit shown in Fig. 1, showing in full lines certain of the mechanism housed in and mounted upon the casing thereof.
Figure 3:
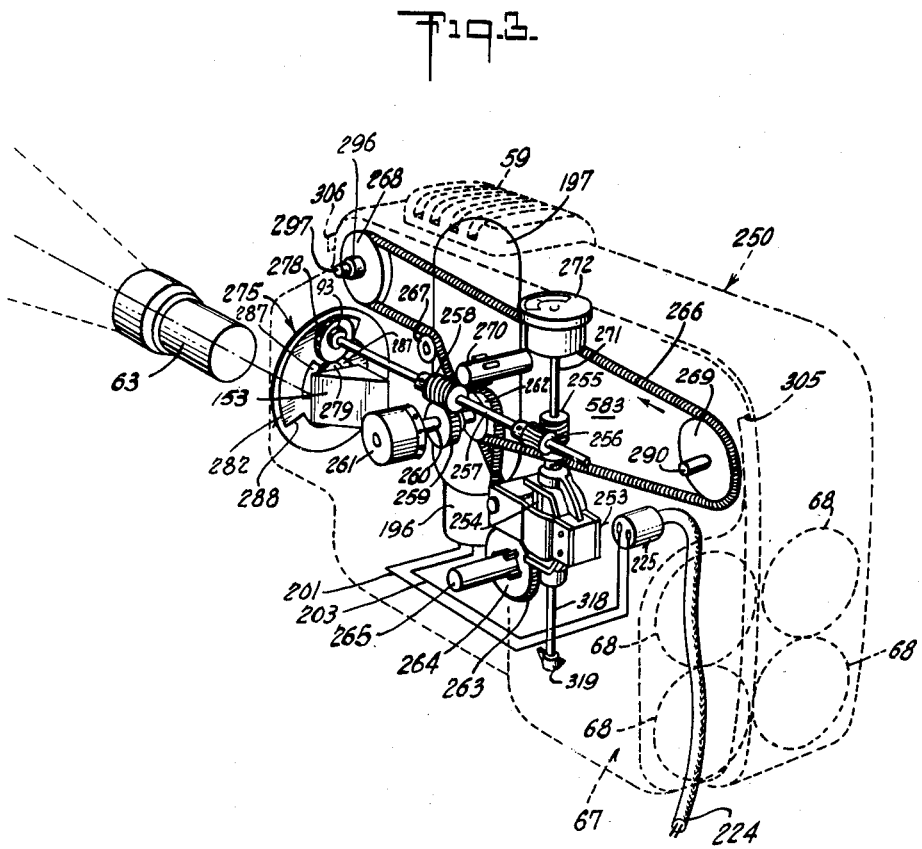
Fig. 3 is a phantom perspective to enlarged scale of the camera unit of Fig. 1 which is mounted upon the base unit of Fig. 2 to provide the projector assembly of Fig. 1, showing in full lines certain of the mechanism housed in the casing thereof and with parts broken away, electrical connecting means employed to transfer A.C. power thereto for the housed projector light being indicated.

Referring to the drawings, in which like numerals identify similar parts throughout, and, more particularly, to Figs. 1 to 5 inclusive, it will be seen that one embodiment of the present invention may be described as follows. The camera and projector base units assembly includes the camera unit 250 which, when employed as a camera, has its whole left side covered by a removable cover that has been omitted from the drawings since it is removed for projector operation. The main chamber defined by the casing thereof is subdivided longitudinally into left side and right side compartments 84 and 85 by a longitudinal partition 583 indicated in Figs. 1 and 4. The left side chamber 84 terminates in its lower portion forward of a rear compartment 67, indicated in Figs. 1 and 3, which houses a plurality of dry cells as a source of D.C. power, indicated in dotted lines at 68—68 in Fig. 3. Battery motor 253, shown in Figs. 3 and 4 is mounted in the right side compartment 85 beyond longitudinal partition 583 as viewed therein. The rotor 254 of the motor 253 drives a worm 255 meshed with a worm gear 256 fixed upon a horizontal main drive shaft 257. The main drive shaft 257 also carries a worm 258 meshed with a worm gear 259 fixed upon a cross shaft 260, which carries on one end a film-advancing sprocket 261 and on the other end a drive pulley 262 of the double-sheave type. The double-sheave pulley 262 has a crossed belt 263 lapped thereabout and about another pulley 264 which drives a camera take-up reel spindle 265. The double-sheave pulley 262 also has lapped against the bottom side thereof a run of another long belt 266, which is trained up over a tensioning idler 267 and lapped about two sheaves or pulleys 268 and 269 respectively at the front and rear near the top of casing. The camera supply spindle 270 is mounted for free rotation to the supporting structure provided by partition 583.

The motor rotor 254 carries above the drive worm 255 a shaft extension 271 which operates a tachometer device 272, the dial face of which is set flush in the top of the casing 250. The longitudinally-extending main drive shaft 257 carries on its front end a spur gear 278 fixed thereto for drive thereby, to constitute part of a shutter mechanism 275. Spur gear 278 is constantly in mesh with a second spur gear 279, rotatably supported upon a swinging arm (not observable in Fig. 3) which is pivoted about the axis of the drive shaft 257 to form a sun and planet gear mechanism. The planet spur gear 279 is rotatably supported on such swinging arm and carries therewith a circular shutter plate 282 fixed to the planet gear for rotation thereby. Rotary shutter plate 282 has two circular zones each having one or more cut-outs which in swing of the shutter plate from one position to another alternatively are rotated past the gate aperture to serve, those of one zone serving for camera operation and the other for projector operation in the general manner proposed in United States Tartas et al. Patent No. 1,377,322. Preferably the cut-outs in the inner zone consist of three symmetrically arranged arcuate slots 287—287, each of which extends about 60°, with plate structure intervening any two thereof forming light cut-off shutter vane structure also extending about 60°. Preferably the second zone is located marginally of the circular shutter plate 282 radially beyond the inner zone in which the three slots 287—287 are located and has an arcuate cut-out portion thereof extending about 180° to provide cut-back notch 288. Thus, the series of three arcuate slots 287—287 and intervening shutter plate structure constitute the shutter means for projection operation to be rotated in a path including the gate aperture when the side cover panel is removed and the device conditioned for projector operation. When the side cover panel is replaced, so that the shutter plate 282 is swung by suitable mechanism (not shown) to the left to the camera position, it will be seen that the cut-back notch 288 rotates in a path across the gate aperture for camera operation. Accordingly, the light beam in the common optical path to and from the optical gate window or aperture is intercepted on projection operation three times during one rotation of the main drive shaft 257 by vanes, each extending about 60°, and is intercepted on camera operation only once during each revolution of the main drive shaft by a vane extending about 180°.

Film translating mechanism is provided which may include conventional shuttle intermittent means featuring a pull-down claw given reciprocative motion by a suitable rotary heart cam 93 carried by the main drive shaft 257 behind gear 278, as shown in Fig. 3.

The rear pulley 269 carries on the back side thereof a drum 289 of a conventional over-running ball clutch device which freely rotates about a stepped cylindrical clutch core 290 constituting the shaft about which pulley 269 is freely rotatable in the clockwise direction as viewed in Fig. 1, but which is locked thereto when rotated counterclockwise, as there viewed. Thus, when belt 266 travels forward from the rear pulley 269 to the front pulley 268 along the upper run thereof, the core shaft 290 which is rotatably supported by longitudinal partition 583, is rotated counterclockwise to rotate in the same direction outer driving pulley 291, about which is lapped a spring belt 292, in turn trained about a pulley fixed on projector take-up reel spindle 293, to rotate the latter as it is supported on the upper end of an upwardly-extending swinging arm 294. The front pulley 268 also has associated therewith a conventional over-running clutch device, the drum of which is carried by this front pulley for rotation about the axis of the other element of this second clutch device consisting of a sleeve 296 rotatably mounted on shaft 297 pivoted to partition 583. The parts of the over-running clutch device of the front pulley 268 are reversed from those of the clutch device of the rear pulley 269. Thus when the top run of the belt 266 is traveling forward, as viewed in Fig. 1, the clutch device of the front pulley 268 is declutched so as not to drive its core sleeve 296 and with that clutch pulley also rotating counterclockwise, as viewed in Fig. 1. The over-running clutch devices may be mounted on either side of the longitudinal partition 583 as desired, with suitable rearrangement and order of parts assembled therewith. The clutch sleeve 296 of the front pulley clutch device carries fixed thereto a sheave 298 to drive a looped belt 299 which is lapped up over a pulley fixed to the supply reel spindle 300 carried by the upper end of outwardly-extending pivoted arm 301. Accordingly, when take-up reel 302 on spindle 293 is driven in the counterclockwise direction, as viewed in Fig. 1, to reel up thereon single-width film 209, the supply reel 303 on spindle 300 is not driven and, if desired, may be braked by any suitable means well known in the art, such as drag felts. On the other hand, if the drive of the mechanism be reversed, the clutch of the rear pulley 269 will be declutched so that the rear projector reel 302 will not be driven and the front pulley 268 will be clutched so that the front projector reel 303 will be driven in a counterclockwise direction for rewind.

On the right side of the camera unit 250 a perforated or slotted cover 59 closes the outer side and top of a light source or lamp housing area defined in the front portion of the right side compartment 85 by adjacent structure, the portion of such cover being indicated in dotted lines in Fig. 3. This light source area in the camera unit 250 suitably houses an electric light socket 196 which removably receives an electric lamp or light bulb 197. A terminal connector wire 201 to one terminal of the lamp socket 196 and another terminal connector wire 203 is connected to the other terminal of the light socket. Thus, connector terminal wires 201 and 203 when connected to an external source of electric power, such as a household A.C. electrical supply circuit, will light the lamp 197 to serve as a light source for projection operation. The terminal wires 201 and 203 are suitably connected to pin terminals exposed on the right side of the camera case and current is supplied thereto by a two-wire electric supply cable 224 having a plug-in connector 225 equipped with female receptacles receptive of the pin terminals, the female receptacles being referenced 228 and 229 as indicated in Figs. 2 and 5. The light source lamp 197 is mounted opposite an optical path hole or aperture 141 in longitudinal partition 583 with this hole being located between the light source and an oblique mirror 153 carried in a mirror and gate housing means 151. The mirror and gate housing means 151 is mounted on a forwardly-biased retractable sliding plate guided for longitudinal motion on partition 583. The rays of light from the lamp 197 pass transversely through the hole or aperture 141, when open or uncovered, across to the oblique mirror 153 and are there reflected at an angle of about 90° forward through the film and gate aperture behind the rotary shutter mechanism 275.

The front reel-supporting arm 301 is fixed upon the core shaft 297 which extends axially through the over-running clutch core sleeve 296 to the far side of the partition 583. It will be understood from Fig. 4 that core shaft 297 may carry, fixed thereto, a crank arm 307 having an outwardly-extending pin 308, which is disposed in a horizontal slot 309 in a vertically-slidable guided blind panel 310 selectively to cover and uncover the optical path hole 141 in the partition 583 between the light source compartment and the left side compartment 84. Thus, when the reel supporting arm 301 is folded down into the compartment 84, as indicated in dot-dash lines in Fig. 1, the blind slide panel 310 is lowered to cover the optical path hole 141. When the reel-supporting arm 301 is swung up and forward to the extended position shown in full lines in Fig. 1 for projector operation, the crank arm 307 lifts the blind panel 310 to uncover the hole 141 to permit light rays to pass from the light source to the oblique mirror for reflection forward through the developed single-width film on projection operation.

A vertical slot 311 in the partition 583 slidably receives therein a pin 312 fixed on the blind slide panel 310 and the pin 311 rotatably supports tension idler 267, which is disposed beneath a bottom run of the belt 266, as will be understood from Fig. 3. Thus, in camera operation with the reel-supporting arm 301 folded down within the encased unit 250, the belt 266 is slacked off so that there will be no drive of the front and rear pulleys 268 and 269; but when the left side cover panel is removed and the arm 301 is swung up to the position indicated in Figs. 1 and 4 for projector operation, the idler 267 is raised by the blind slide panel 310 so as to tighten the belt 266 for drive of the front and rear pulleys 268 and 269.

It will be noted from Figs. 1 and 4 that when this embodiment of the camera-projector apparatus 250 is conditioned for projector operation, it is mounted upon a base unit 313. Base unit 313 houses blower 219 and its driving A.C. motor 218 which, as will be seen from Figs. 2 and 4, carries a beveled gear 314 on one end of its shaft meshed with a beveled gear 315 fixed on a vertical shaft 316 which extends up through the top of the base unit casing, there to carry a slotted and tapered driving socket 317 as a part of the coupler. The D.C. motor rotor 254 carries a downwardly-extending shaft extension 318 which supports on its lower end a fined and tapered driving head 319, adapted as another part of the coupler to be socketed in driving head 317 for drive by the latter. Thus, D.C. motor 253 is not intended to serve any function in projector operation since the main drive shaft 257 will be driven by worm gear 256, worm 255 and the rotor shaft extension 318 from the drive socket 317, in turn driven by the base unit motor 218, which also operates the fan or blower 219. Switch 320 on the side of the base unit 313 is of the double-pole, double-throw, reversing type, as will be understood from the circuit diagram of Fig. 5, and household current, such as that rated at 60 cycles and about 115 volts, is supplied thereto by a supply cord 222 through a rheostat 233. The conductors of the two-wire cable 224 are connected to the wires of the supply circuit 222 within the base unit 313, as indicated in Fig. 5. Also, as shown in the wiring diagram of Fig. 5, the D.C. motor 253 is connected by conductors 79, 80 and 114 through switch leaves or contacts 107 and 106 to the dry cells or batteries 68—68 housed in the camera compartment 67. A finger-operated button slide 119 on the outer face of the right side of the camera casing carries an insulated switch operator 122 which pushes the switch leaves 106 and 107 together for D.C. circuit switch closure to operate the motor 253 from D.C. power on camera operation with camera unit 250 removed from projector base unit 313. Terminals 110 and 112 may be provided, exposed to access on the side of the camera case, respectively connected by wires 109 and 113 to switch contact 106 and to switch contact 107 and motor terminal 114 so that, if desired, during camera operation the D.C. circuit in the camera may be closed for operation of the D.C. motor 253 by a remote control circuit closing switch cable plugged into the side of the camera case for connecting a remote control switch across the terminals 110 and 112.

Outlet duct or tube 220 of the casing of blower 219 supplies cooling air from the fan to the bottom of the lamp housing area in compartment 85, being received in a hole 221 in the portion of the camera case defining the bottom of this compartment, as shown in Fig. 4. Blower outlet duct 220 may have a flexible mount to the encased camera unit 250 or a solid demountable connection, such as a bayonet joint. Such flexible connection may be accomplished by providing an elastic flexible gasketing ring 322 inside the camera casing about the hole 221 in the bottom panel thereof snugly to receive the fan eduction tube 220; and this flexible connection may be desirable since proper alignment of the shafts 316 and 318 should be attained for efficient drive operation thereof without any tendency to cramp the bearings or coupling connection at the drive head 317. The hole 221 may, if desired, be temporarily closed by flexible shutter means receptive of duct 220 in lieu of gasketing ring 322 to provide a similar flexible connection.

*Operation.*—Let it be assumed that it is desired to employ the camera unit 250 in projection of moving pictures. The left side cover of the camera unit will be removed to expose the left side parts as in Fig. 1. This causes the shutter mechanism 275 to be swung over to the position for projector operation, with the outside zone of the shutter disk 282 which is notched at 288 aligned with the gate aperture. The supply reel support arm 301 will be swung up manually from the dot-dash position shown in Fig. 1 to the full line position shown therein, causing the blind slide 310 to be lifted from the dotted position shown in Fig. 4 to the full line position shown therein to uncover optical path or light rays aperture or hole 141. Thus, when lamp 197 is lighted by feed of electrical energy thereto light rays therefrom are permitted to pass through the hole 141 in partition 583 to the oblique mirror 153. The take-up reel support arm 294 is also swung up from its dot-dash line position shown in Fig. 1 to its full line position shown therein. Then the camera unit 250 is mounted upon the projector base unit 313, but if desired some of these operations may be deferred, if desired, until the camera unit is mounted upon the base unit.

The camera unit 250 is moved manually down over the projector base unit 313 and the driving connector head 319 on the camera unit is socketed into the driving connector socket 317 on the base unit as the blower outlet tube 220 is inserted up into the hole 221 in the bottom of the camera case beneath the lamp 197. The camera unit 250 is thus now mounted upon the projector base unit 313 with mechanical drive connection and cooling air connection provided therebetween. Electrical connection therebetween is effected by plugging the cable connector 225 into its receptacle on the right side of the camera case to connect the female circuit terminal connectors 228 and 229 respectively to the male terminal connectors attached to conductors 201 and 203 in the camera. When the supply cord 222 is connected to the house power supply circuit the projector lamp 197 will be lighted. The motor 218 will be caused to run to operate the blower 219 in the projector base unit and the shafting in the camera which rotates the shutter and film translating mechanism of the camera unit when the switch 320 is flipped to the projection position.

Exposed and developed film will be loaded in the projector assembly by mounting a supply reel 303, loaded with a roll of such film, on the free-running supply spindle 300 carried by the front support arm 301, as shown in Fig. 1. A take-up reel 302 will be mounted upon the driven take-up spindle 293 carried by the rear support arm 294. As shown in Fig. 1, the forwardly-biased slide plate 150 carries three film-biasing rolls 323, 324 and 325, which will snug up against the film driving sprocket 261, the shaft of which extends through a large hole in the biased plate 150, when the latter is released to its forward position. With slide plate 150 manually retracted, the single-width film, which may be of the 8 mm. type, will be trained down back behind roll 325 and under it to lead forward with lap over drive sprocket 261 up to the top of the gate unit. The gate and film track presser plate housing 151, being carried by slide plate 150, is likewise retracted so that the film can be threaded down in front thereof, the film then being trained up to lap beneath drive sprocket 261 and over rolls 323 and 324, thereafter being lapped over the root portion of idle roll 270 and fed to take-up reel 302 to which its leader will be anchored. Incidentally the outer end of idle roll 270 serves in camera operation to support the supply spool carrying the double-width unexposed film. The gate housing 151 is moved forward to its film-biasing position upon release of slide plate 150 which permits is biasing to move it forward to the Fig. 1 position, and at the same time this slide plate carries rolls 323, 324 and 325 forward to snug against drive sprocket 261 the two runs of films lapped thereagainst.

With supply cord 222 connected to the power supply circuit when the exposed arm or handle of switch 320 is flipped in one direction to the projection position the projection lamp 197 will be lighted and motor 218 energized to run the blower 219 and the shafting in the camera unit 215. As a result, take-up reel 302 is driven as is the film translating mechanism in the camera unit to move the film step-by-step down past the gate aperture and rotating shutter 282, so as to project in conventional manner, patterned light rays passing through the film and out through the projector lens 63, carried by turret 61, to the screen. Knurled knob 734 shown in Fig. 1 can be manipulated to raise or lower the back end of the camera unit 250 for properly centering the projected image on the screen, or the modified form of elevating means proposed at 321 in Fig. 4 may be employed for this purpose.

After a roll of film is run off from supply reel 303 on to take-up reel 302 in projection of images from the film to a screen the user may rewind the film back on to the reel 303 by reversing the operation of the motor, with the film extending directly across from reel 302 to reel 303. Switch 320 accomplishes this purpose when its handle is flipped over to the opposite rewind position. In projection the rear take-up reel 302 is driven through the over-running clutch device in its drive while the drive for the front supply reel 303 is deactivated at its over-running clutch device, and suitable conventional drag braking means may be provided for reel 303 or its drive to apply desired tension on the film being pulled therefrom. In rewind, with a reversal of rotation of driving parts, the front reel 303 becomes driven through the over-running clutch in its drive with the other drive for the rear reel 302 being deactivated at its over-running clutch. During rewind it is a simple matter to operate with the projection lamp 197 unlighted, simply by pulling out the plug 225 from connection on the side of the camera unit 250 with the lamp circuit in the latter.

Figure 6:
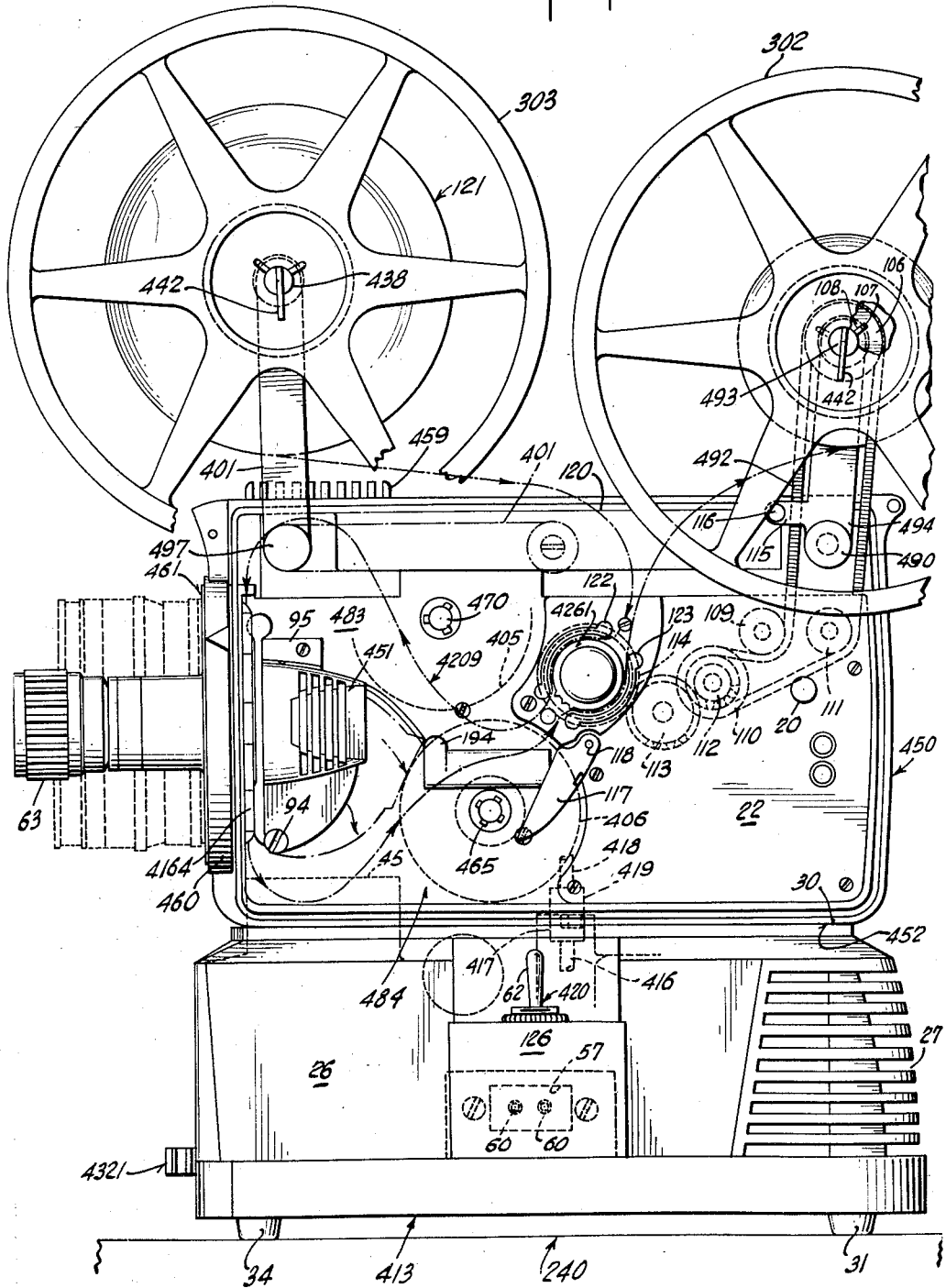
Fig. 6 is a left side elevational view to a larger scale, with parts broken away, of a modified form of the projector assembly of camera unit and projector base unit as constructed for the market.

Another embodiment of the present invention which has been designed for the market is illustrated in Figs. 6 to 17 inclusive. It will be seen therefrom, particularly with reference to Figs. 6, 8, 9 and 15 that the camera-projector unit 450, constituting the superstructure of the combined assembly, has the left side thereof covered for camera operation by a pan-shaped removable side cover 458, the mounted position of which is indicated by dotted lines in Figs. 8 and 15. When the assembly is set up for projector operation, as illustrated in Fig. 6, this left side cover 458 is completely removed so as to permit the reel supporting arms 401 and 494 to be swung up out of the left side chamber 484, defined behind this cover, and in the manner as previously explained in connection with the embodiment illustrated in Figs. 1 to 5 inclusive. Suitable latching means are provided inside the left side cover 458 detachably to engage latching post 20, and the operator for such latch is shown in dotted lines as a slide at 21 in Fig. 8. Post 20 is supported by a plate 22 which covers certain reel driving mechanism and is mounted upon longitudinal partition 483 by suitable spacing means to define a housing space 23 for such drive mechanism therebetween.

The right side of the casing of camera-projector unit 450 is defined by a fixed mid-panel 453 carrying thumb slide button 4119 which operates the D.C. motor circuit switch, a hinged battery compartment door 457, and grilled cover sections 459 and 1459 for the projector lamp compartment. As in the previous embodiment a right side compartment, identified as 485 in Figs. 10 and 15, is defined between the longitudinal partition 483 and the battery compartment door 457, casing panel 453 and the lamp compartment grilled cover means 459—1459, and a transverse partition 469, shown in Fig. 10, subdivides this right side compartment to define the rear battery compartment 467 covered by the battery compartment door.

Drive mechanism for the rotary shutter, the film translating intermittent, the film translating sprocket and film spool and reel drives and spindles is suitably housed in the right side compartment 485 with a D.C. motor operated by dry cells in the battery compartment 467 but has not been shown in detail in Figs. 6 to 17 inclusive since such driving mechanism constitutes no part of the invention claimed herein. This housed drive mechanism may be of the type illustrated in Fig. 3 except with regard to the drives for the projector reels which may differ in the respect illustrated in Fig. 6, as explained hereinafter. Since such drive mechanism is to be driven by the D.C. motor on camera operation but by an A.C. motor in the base unit 413 on projector operation, a vertical drive shaft 418, shown in dotted lines in Fig. 6 and full lines in Fig. 10, suitably connected to such mechanism in the camera-projector unit 450, is provided for the A.C. projector operation. This vertical drive shaft 418 and a clutch element in the form of a claw head 419 fixed thereon is located in a socket 24 defined in the bottom panel 452 of the camera-projector unit casing means by a tubular structure 25 extending up into right side chamber 485, as is best seen in Fig. 10.

The base unit 413 comprises a housing 26 provided with a grilled rear end opening 27, a bottom panel or plate 28 having air inlet holes 29—29 therein and a top panel 30, as will be seen from Fig. 10. The rear end of the bottom plate 28 carries a pair of laterally-spaced supporting feet 31 which rest upon any suitable supporting surface 240, such as a table top. The base unit housing 26 carries therein a fan housing 32 of a blower or fan unit 4219, with the housing connected to the bottom plate 28 and having the front end of its bottom resting upon a bracket 33 also carrying a pair of laterally-spaced feet 34. Bracket 33 carries vertical plate structure 35 lapped against front panel 36 of the fan housing 32 and guided for vertical motion by ears 37 on the fan housing front panel. A U-shaped bracket 38 riveted to the fan housing front panel 36 provides a pair of laterally-extending apertured ears 39 and 139 through which extends a vertical worm 40 fixedly carried by the bracket 33. A knurled thumb wheel 4321 is threadably mounted on the worm 40 beneath the lower ear 139 and rotatably abuts the bottom side of this lower ear with sectors thereof extending through slots in the fan housing 32 and the front of the base unit housing 26, as shown in Fig. 10, so as to be accessible readily for manual rotation. When the knurled wheel 4321 is rotated to climb on the fixed worm 40, the front end of the base unit housing 26 is caused to rise relative to bracket 33 supported by front feet 34 for tilt adjustment of the base unit housing and the camera-projector unit 450 mounted or supported thereon.

A suitable A.C. motor 4218 is mounted in the rear portion of the base unit housing 26 with its rotor connected to a suitable gear reduction drive unit 4314–5 forward from which drive shaft 41 extends through a large air inlet opening 42 in rear panel 43 of the fan housing 32 to carry within the latter fan rotor 44 of the fan unit 4219. The outlet duct of the fan housing 32 is provided by grilled opening 420 in the top panel 30 of the base unit housing 26 and adjacent the right side thereof is provided an upwardly-extending hood 45, as is best seen from Figs. 7, 9 and 10. The face of the hood 45, defined by its end walls 46, 46 and longitudinally-spaced ribs 47—47, is shaped to be juxtaposed to the right side of the camera-projector unit casing means for providing part of the demountable structural connection therebetween and for proper alignment of this superstructure unit upon the base unit when mounted down thereupon.

The reduction gear unit 4314–5 in the base unit housing 26 is suitably connected in a conventional driving manner with a vertical driving shaft 416 which extends up through a boss 48, with the top end of this shaft exposed in and projecting through a hole in the housing top panel 30, as will be seen from Figs. 9 and 10. The exposed top end of the boss 48 is suitably counterbored to provide a socket 49 in which is carried by the vertical shaft 416 the complementary clutch element 417, also of claw formation to have interfitting engagement with clutch element 419 on the bottom of the camera-projector unit 450 when the latter is seated upon the base unit. This disconnectable clutch device in the A.C. drive of the assembly also provides demountable structural connection between the camera-projector and base units.

Since, as in the previously described embodiment, the projector light source or lamp is housed in the camera-projector unit 450 and is to be provided with A.C. electrical energy, circuit wiring for this lamp in the camera-projector unit is provided with suitable electrical connector means to connect such wiring to the A.C. wiring in the base unit 413. Such electrical circuit connector means preferably is in the form of a pair of male pin connectors 50 and 51 suitably insulated from each other and located in a socket 52 in the bottom panel 452 of the camera-projector unit 450. A female connector 425 is mounted in the base unit housing 26 with its upper end projecting up through a hole in the top panel 30 thereof, as shown in Fig. 10, to be received in the socket 52 in the camera-projector unit bottom panel 452, and this female connector has a pair of terminals in the form of pin-receptive sleeves 428 and 429 of electrically-conducing material, suitably insulated from each other, which receive the terminal connector pins 50 and 51 respectively when the camera-projector unit 450 is seated down upon the base unit 413. Thus, this electrical connection between projector lamp circuitry in the casing means of the camera-projector unit and A.C. circuitry in the base unit 413 additionally provides demountable structural connection between the camera-projector and base units.

Means are also provided for securely locking the camera-projector unit 450 to the base unit 413 when the former is seated upon the latter with drive connection, electrical connection and air flow connection provided therebetween. As will be seen from Figs. 9, 10 and 12, such locking means may be in the form of an undercut notch 53 in the bottom panel 452 of the camera-projector unit 450, providing a latch lip 530, and a hook 54 threadably carried by a transverse screw 55 rotatably supported by the base unit housing 26 beneath its top panel 30 and extending out through the side thereof to carry on its outer end an accessible manual knob 56. When the knob 56 is rotated counterclockwise, screw 55 retracts the locking hook 54 to the position shown in Fig. 9, so as to be readily insertable in the recess 53 upon seating of the camera-projector unit 450 on the base unit 413. Clockwise rotation of the knob 56 causes the hook 54 to travel forward on the screw 55, so that its nose 540 will hook over the lip 530 in the recess 53, as shown in Fig. 12, to lock the units together. Thus, this locking means serves as additional demountable structural connection between the camera-projector and base units.

The circuit diagram of Fig. 11 shows the A.C. wiring in the base unit 413. As seen in full lines in Fig. 7 and in dotted lines in Fig. 6, the right side of the base unit housing 26 is provided with a recess 57, the inner end of which is defined by a plate 58 of insulating material carrying pin male connectors 60, 60. Any suitable supply cord having a pair of conductors 222 may be provided with a suitable female connector to plug into the recess 57 with terminal sleeves therein receptive of the pin terminals 60, 60, so that when such cord is connected to the household power circuit the circuitry of the base unit 413 will be supplied with A.C. power. The left side of the housing 26 of base unit 413 carries in a suitable boss 126 a double-pole double-throw switch, the manual operating handle or knob 62 of which is shown exposed for access in Figs. 6 and 9. Wires 4222 connect the pin connectors 60, 60 respectively to mid terminals 64 and 65 of the switch 420, as shown in Fig. 11, and switch terminal 64 is connected to the female connector sleeve 428 mounted in the top panel 30 of the base unit housing 26. One terminal of the motor 4218 is connected by a wire 66 to the switch mid terminal 65 and the other motor terminal is connected by wire 166 to switch pole 69 which in turn is connected by jumper 169 to an opposite switch pole 70. Female connector sleeve 429, also mounted on the top panel 30 of the base unit housing 26, is connected by a wire 71 to switch pole 72 which is companion to switch pole 69. Thus, with the A.C.

circuit in the base unit 413 connected by suitable supply cord 222 to a source of A.C. power, if the switch 420 is manipulated to a so-called "projection" position, i.e., thrown forward for connection of mid terminal 65 to pole 72 by moveable contact element 73 for connection of mid terminal 64 by moveable switch contact 74 to switch pole 69, the motor 4218 will be energized to rotate the fan rotor 44 and drive coupling 417 while current is supplied to terminal pin sleeves 428 and 429 so that A.C. power may be supplied through the A.C. circuit in camera-projector unit 450 to cause the projector lamp to light. When the switch 420 is thrown in the opposite direction or back to the so-called "rewind" position only the motor 4218 will be connected through the jumper 169 to the electrical supply source.

The right side compartment 485 is partially subdivided in the front end of the camera-projector unit 450 to provide a projector light source or lamp recess 75, which when closed off by lamp house cover sections 459 and 1459 serves as a lamp housing compartment, as best seen in Figs. 8, 13, 14 and 15. Mid panel 453 of the camera-projector unit casing is terminated appreciably short of the front end crosswall, defined chiefly by a shallow head chamber 460 which rotatably carries turret 461, on which projector lens 63 is supported, to provide this lamp house recess. Lamp house recess 75 is covered at the top and in its upper portion by inverted L-shaped grill cover section 459. The companion L-shaped cover section 1459 closes off the lower portion of the side of this recess and covers the bottom thereof. The inverted L-shaped cover section 459 is provided with through slots 76—76 to serve together as the outlet opening from the lamp house compartment 75 to release hot air therefrom for suitably cooling lamp 197 mounted therein. However, the side portion of the L-shaped cover section 1459 is imperforate and merely carries ribs as decorative continuations of those intervening the slots in the inverted L-shaped cover section 459. But the bottom portion of the lower lamp house cover section 1459 is provided with a plurality of openings which together form the grilled inlet hole 421 through which cooling air is forced by the fan 4219 in the base unit 413, and it is this lower cover section which is fitted to the shaped face of the hood 45 on the base unit housing 26, so as to juxtapose the inlet hole 421 to the outlet duct opening 420. In the bottom of the lamp house recess 75 is mounted a body 77 of suitable insulating material having a central socket-supporting element 177 and a surrounding C-shaped wall 277 seated on ledge 78, with the wall and central elements thereof connected together by integral arms 377, 377. Lamp socket 496 is seated upon and supported by central element 177 of block 77, and thus is held in spaced relation to surrounding structure for free flow thereabout of cooling air. A connecting wire 4201 connects the pin connector 50 to one terminal of the lamp socket 496 and a wire 4203 connects the other pin terminal 51 to the other terminal of the lamp socket, as will be noted from Fig. 8.

Ledge 78 has suitable internally-threaded holes 80 therein which receive a pair of anchoring screws 81 to fasten the bottom portion of the lamp compartment cover section 1459 thereto, and the top end of this lamp cover section is provided on opposite sides with notches 82, 82 which receive pins 83, 83 as this top end is slid upwardly for anchoring its bottom part by the screws. On the underside of the lateral top part of the upper lamp compartment cover section 459 are provided a pair of downwardly-extending pins 183, 183 which are received in pinholes 182, 182 in ledges 86, 86 in the top of the lamp compartment recess. A spring-biased thumb latch 87 on the side of the lamp compartment top section 459 has a catch 88, as seen in Fig. 16, which receives a projection 89 on the inner face of lamp compartment lower cover section 1459. This permits ready removal of the lamp compartment top cover section 459 for change of the projector lamp 197 when needed.

The lamp compartment upper cover section 459 carries fixed thereto a vertical lamp stack 498, as seen in Fig. 15, which has a hole 90 in the outer side thereof to be aligned with a concave reflector 91 carried by the inner side of the lower lamp compartment cover section 1459, as shown in the adjacent portions of Figs. 15 and 16. The inner side of the stack 498 is provided with a slot 499 to permit light rays to pass laterally inward through light hole or aperture 441 in the longitudinal partition 483. The lamp 197 and the light aperture 441 are intervened by a curved plate 92, shown in Figs. 8, 13 and 15, which extends from near the top of the lamp compartment recess 75 to the lamp socket 496 and shields mechanism therebehind from lamp heat. The shield 92 has a hole therein over which is fitted lens 400 to concentrate light rays for passage through the light aperture 441 into the left side compartment 484 to strike against the oblique mirror 453 carried by the gate unit 451, so as to be turned through about 90° to pass forward through the film being translated across the gate aperture and thence into the shallow head chamber defined by the structure indicated at 460 in which the rotary shutter is operated for interrupting the light rays in their path toward the projection lens 63.

As will be seen from Figs. 6, 8, and 15, the rotary shutter chamber 460 has mounted therebehind a fixed wall track plate 4164 along or down which the film is translated step-by-step by suitable intermittent means, the claw 4175 of which is shown in Fig. 15 as extending through an elongated slot 4166 in the track. One side, i.e., the inner side or half of the track plate 4164 is provided with the gate aperture 4165 across which the developed film to be projected is translated with its left edge guided by suitable spring-biased fingers 4184, 4184 extending back through holes or slots in the film track plate. Incidentally, when such a camera-projector assembly is designed for projecting 8 mm. developed film, the camera-projector unit 450 when utilized as a camera will handle unexposed film which is 16 mm., translating first one side zone down past the gate aperture 4165 and then, upon reversal, the other side zone, to expose series of picture frames first in one half and then the other half. As is understood in the art, such wide camera film after exposure is then, during the developing procedure, split down the center and the two resulting strips which are 8 mm. wide are attached together end-to-end for projection.

The gate unit 451 which carries the oblique mirror 453 is pivotally mounted upon a pivot screw 94 carried by longitudinal partition 483 so that it may be swung from the closed full line position, shown in Fig. 6, in which it snugs the translated film against the film track plate 4164, to the open dotted line position shown therein with rest against a stop projection 194 so as to permit ready threading of the film through the gate structure. A bracket 95 on longitudinal partition 483 is located above the top edge of the gate unit 451 and carries a spring-biased detent to hold the latter in the closed full line position.

As will be seen from Figs. 14 and 15 there is defined a space intervening longitudinal partition 483 and the lamp house shield 92 in which is mounted a blind vane and operating mechanism therefor, designed to shut off passage of light through the light aperture 441 in the longitudinal partition when the camera-projector unit 450 is used as a camera in taking pictures, and to uncover this light passage aperture when such unit is employed with the base unit 413 in projecting pictures. Such blind vane is operated by the pivoted front reel support arm 401 which carries the supply reel for the exposed film when the assembly is used as a projector, as illustrated in Fig. 6. It will be understood from Figs. 6, 14 and 15 that the arm 401 is fixed upon a headed shaft 497 which is rotatably mounted through longitudinal partition 483. The far end of shaft 497 in the space between longitudinal partition 483 and the lamp compartment shield 92 carries, fixed thereto, a crank arm 407 which is connected by link 96 to a lever 97 pivotally supported at 98 to longitudinal partition 483. Lever 97 has a slot 409 therein in which rides a pin 408 mounted upon blind vane 410 pivotally supported at 99 on the longitudinal partition 483. It will thus be understood from Fig. 14 that when the reel support arm 401 is in the dot-dash horizontal position, indicated therein, for complete housing in left side compartment 484 upon replacement of the left side cover 458 for camera operation, the crank arm 407 is swung down counterclockwise so that link 96 pushes down on the end of lever 97 to cause it to swing the blind vane 410 down in a counterclockwise direction as viewed in Fig. 14 by virtue of engagement of its pin 408 in the slot 409. As a result, blind vane 410 is caused to cover the light passage aperture 441, thereby preventing light rays from passing from the lamp 197 in lamp compartment 75 through the lens 400 and this light passage aperture to the oblique mirror 453 carried by the gate unit 451. When the reel support arm 401 is swung up from the dot-dash position shown in Fig. 14 to the full line position shown therein, so as to receive and support supply reel 303, as indicated in Fig. 6, following removal of the left side cover 458, these parts are moved to the full line positions indicated in Fig. 14, thereby swinging the blind vane 410 up clockwise to a position above the light passage aperture 441 to permit light rays to pass therethrough from the lamp compartment 75 to the oblique mirror 453.

Since, as will be understood by those familiar with moving picture projectors, the rotary shutter of such a device is mounted beyond or outward of the gate aperture, such as that indicated at 4165 in Fig. 15, and incidentally thus housed in shallow head chamber 460, and because this rotary shutter is of the dual purpose type described above in connection with the embodiment of Figs. 1 to 5 incl., means must be provided for swinging such shutter about main drive shaft 4257 which rotates it so that one zone thereof is employed for projection and another zone thereof is used for camera operation, as previously indicated. In the embodiment of Figs. 6 to 17 incl., the swinging arm 480 which carries such rotary shutter and swings its driving gear as a planet gear about a sun gear on the end of main drive shaft 4257 in head chamber 460 has the top end thereof exposed for access in a hole 100, shown in Fig. 15. As will be seen from Fig. 14, such exposed top end of this rotary shutter swinging arm 480 is bent laterally back and bifurcated by the provision of a notch therein which receives one end 101 of a bent wire lever of the second class pivotally mounted at 102 to a plate 103 covering the hole 100 seen in Fig. 15. The other end 104 of this bent wire lever 101 is received in a notch in bifurcated end 105 of a bracket carried by blind vane-operating lever 97. Thus, when the reel support arm 401 is swung up from the dot-dash position to the full line position, shown in Fig. 14, to swing the blind vane 410 up to a position uncovering the light passage aperture 441 in longitudinal position 483, lever 97 in that blind vane-operating mechanism also causes the bent wire lever 101 to swing the rotary shutter-carrying arm 480 to the left as seen in full lines in Fig. 15, properly to position the rotary shutter for projection operation. When the supply reel support arm 401 is swung down from the projection position shown in Figs. 6 and 14 into the left side compartment 484, the bent wire lever 101 swings the rotary shutter-carrying arm 408 to the right so as properly to position the rotary shutter for camera operation. Thus the swinging of the reel support arm 401 up to projection position for support of the supply reel 303 automatically positions the blind 410 and the rotary shutter for proper projection operation, and, likewise, automatically swings them to proper positions for camera operation when such reel support arm is swung down into the camera casing.

The film translating sprocket 4261 which is rotatably supported on the left side of longitudinal partition 483 is, as previously indicated, rotated by the drive mechanism in the camera casing, as will be more fully understood from the showing in Fig. 3. Since the take-up reel 302, which is supported on the rear reel support arm 494, must be driven in order to reel up thereon in projection operation the exposed film after it has passed down through the gate mechanism the upper end of this arm carries a spindle 493 which rotatably supports a pulley 106 carrying a pin 107 engageable in one of the three notches 108 in the hub of the reel to drive the latter. Pulley 106 has lapped thereabout the driving belt 492 which extends on the front side down behind plate 22 beneath free roll 109 and forward to be lapped about driven pulley 110 behind this plate, as indicated in Fig. 6. Belt 492 then extends back and is lapped behind free roll 111 to extend up along the rear edge of support arm 494 finally for lap over the driving pulley 106 on spindle 493. It will be understood from Fig. 6 that belt-driving pulley 110 is driven by a gear 112 fixed thereto, which is meshed with an idler gear 113 in turn meshed with gear teeth 114 carried by driven sprocket 4261, so that when the latter is driven on projection operation the rear take-up reel 302 will be driven therefrom at a proper speed as determined by the reduction gearing provided by gear teeth 114, idler 113 and driving gear 112. As will be seen from Fig. 8, the rear reel support arm 494 is pivotally mounted by headed pin or stub shaft 490 carried by longitudinal partition 483 and preferably this head is grooved so that the rear run of belt 492 will lap thereover when this rear reel support arm is swung forward down into the camera left side chamber 484. A bracket arm 115 on the front edge of rear reel support arm 494 carries a pin 116 which is swung down counterclockwise in such folding down of rear reel support arm 494 to bear against the front run of the belt 492. In this manner belt 492 is kept tensioned to prevent it from jumping off of reel-driving pulley 106 when the rear reel support arm is swung down into the camera and suitable provision is made for deactivating driving sprocket 4261 at such time since it has no function in camera operation.

As is explained in the companion joint patent application of Fritz Blank and myself, Serial No. 718,465, filed February 28, 1958, for Driving Mechanism for Combined Moving Picture Camera and Projector Apparatus, which covers the drive mechanism of the assembly, film translating sprocket 4261 is geared to the vertical shaft 418 so that only when the latter is driven by the base unit motor 4218 through the interengaged clutch elements 417 and 419 while the camera-projector unit 450 is seated upon the base unit 413 is this sprocket driven. In order to assure full understanding of the difference between camera operation and projection operation of the camera-projector unit it may be well to point out that, just as in the embodiment of Figs. 1 to 4 incl., the supply spool, a portion of which is indicated in dotted lines at 405 in Fig. 6, for the unexposed film to be used in camera operation is mounted upon spindle 470 carried by longitudinal partition 483 and this film after exposure is reeled up on a take-up spool, indicated in dotted lines at 406 in Fig. 6, mounted upon driven spindle 465 after passage down through the gate unit. Finger 117 shown in Fig. 6 is a feeler which rides against film being spooled up on take-up spool 406 in camera operation to rotate its supporting shaft 118 slowly in a counterclockwise direction for suitable operation of a film footage indicator, not shown since it forms no part of the present invention.

As is shown in Fig. 15 the supply reel support arm 401 carries its reel supporting spindle 438 in the form of a fixed post having its outer end slotted and with a finger 442 pivotally mounted in the slot so that when the finger is aligned with the post the hole in the hub of the reel will readily receive them therethrough. After the reel is mounted on the support arm post 438 the finger 442 may then be turned down normal thereto, as is indicated in Fig. 6, temporarily to hold the reel thereon. The reel support post 493 of the rear reel support arm 494 may be similar to the reel support post 438, except that it may be somewhat longer and stepped in diameter at its root rotatably to support thereon the driving pulley 106. Reel support spindle post 493 is also slotted in its outer end and carries in the slot a similar pivoted finger 442 for like purpose. Each of the reel support arms 401 and 494 carries on the back side thereof a latch in the form of a leaf spring 119 having its upper end riveted to the arm and with its lower end sprung back away from the arm to snap over a lateral ledge 120 on the face of longitudinal partition 483 when the arm is pivoted to its upright position, as shown in Fig. 15. When it is desired to fold each of the reel support arms 401 and 494 down into the left side chamber 484, the lower end of its latching leaf spring 119 is pressed inward to free it from the ledge 120, thereby permitting the arm to be swung down into the camera left side chamber 484, so as to permit after folding in of such support arms replacement of the camera left side cover 458 for camera operation of the camera-projector unit 450.

In operation of the embodiment of the invention illustrated in Figs. 6 to 17 incl., as a projector in the projection of moving pictures, let it be assumed that the camera-projector unit 450 will be first conditioned for projector operation. The left side cover 458 will be removed and the reel support arms 401 and 494 will be swung up in opposite directions to their upright positions, as illustrated in Fig. 6. A supply reel 303 having a roll 121 of developed film wound up thereon will be mounted on the spindle 438 of arm 401 with the finger latch 442 initially extending out in alignment therewith. After positioning of reel 303 on spindle 438 the finger latch 442 will be swung down to the full line position illustrated in Fig. 6. The leader end of the film 4209, as it is drawn off of the roll 121 of film on supply reel 303, will be looped back and then trained forward through between film translating sprocket 4261 and top guide shoe 122, as indicated by dot-dash lines therein, and thence to the top of the front of gate unit 451 with the latter swung back down to the dotted line position shown in Fig. 6 as determined by the stop 194. The film leader will then be drawn down in front of gate unit 451 and lapped beneath it back and upward through between the opposite side of film translating sprocket 4261 and lower guide shoe 123, and thence up to take-up reel 302, mounted in a similar manner on reel support arm spindle 493, to be there anchored so as to be wound up thereon as the projector assembly is operated. The gate unit 451 finally will be swung up from the dotted line position shown in Fig. 6 to its full line position shown therein for latch thereof by the detent carried by bracket 95, so as to snug the film to the film track plate.

The base unit 413 will be suitably rested upon a supporting surface 240, such as a table top, facing toward a remotely located, suitable screen. A supply cord will be plugged into the right side of the base unit 413 for connection of the pin terminals 60, 60 to the household electrical power supply circuit. The camera-projector unit 450 will then be seated upon the top of the base unit 413.

In seating the camera-projector unit 450 down upon the base unit 413, a locating pin 124 on the top panel 30 of the base unit is guided into a socket 125 in the bottom panel 452 of the camera-projector unit as the connector block 425, the top projecting end of the clutch structure or boss 48 housing claw clutch element 417 and the locking hook 54 are respectively guided into the electrical connector recess 52, the receptive bore 24 housing the other clutch claw element 419 and the locking recess 53. This will guide the grilled inlet opening 421 in the bottom panel 452 of the camera-projector unit 450 down to juxtaposed relation to the grilled fan outlet duct 420 on the top panel 30 of the base unit 413, while fitting the bottom portion of the lower lamp compartment cover section 1459 down in juxtaposed relation to the face of the hood 45 on the top of the base unit. In this fashion, mechanical drive connection, electrical circuit connection, structural locking connection and air flow connection is effected between the base unit 413 and the camera-projector unit 450 seated down thereon.

Turret 461 will be rotated to bring the projector lens 63, carried thereby, to alignment with the gate aperture 4165. When the switch handle or arm 62 is thrown forward to the "projection" position, motor 4218 will be driven to operate fan 4219 and, through the drive coupling, rotate the vertical shaft 418 so as to drive from the latter the mechanism in the camera-projector unit 450. At the time switch 420 is manipulated in this fashion to the "projection" position the electrical circuit leading to the projection lamp 197 will cause the latter to be energized so that light rays will pass forward successively through the partition lens 400, the light ray passage aperture 441, to the oblique mirror 453 and then forward successively through the film being translated through the gate unit, the notch in the rotary shutter mounted in the head chamber 460 and the projector lens 63 for projecting images upon the screen. If required, the image on the screen may be suitably centered by raising or lowering the front end of the housing 26 of base unit 413 as demanded, by suitable manipulation of the hand wheel 4321.

After the film 4209 has been run through the camera-projector assembly of Fig. 6, the film wound up on the rear take-up reel 302 may be transferred to the supply reel 303 by a "rewind" operation. For this purpose the positions of the reels 302 and 303 are reversed so that the take-up reel is now supported upon the spindle 438 of the front support arm 401, and the supply reel is now supported upon the spindle 493 of the rear support arm 494 to be driven by pulley 106. The knob 62 of the switch 420 will be swung back in the opposite direction to the "rewind" position so as to energize the motor 4218 but without energization of the projection lamp 197, and the film on the take-up reel 302 now mounted on the front support arm 401 will be fed directly back to the supply reel 303 now on the back support arm 494.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a motion picture camera-projector apparatus adapted to handle unexposed film for taking pictures and developed film for projecting pictures, the combination comprising a manually portable camera-projector unit having casing means housing camera and projector film translating and shutter mechanism, said casing means having a wall portion, a power source housed in said casing means to drive said mechanism on camera operation, a ventilated compartment in said casing means to carry an A.C. light source for projection operation and having an air inlet opening in said casing means wall portion and an external air outlet, A.C. electrical wiring in said casing means leading to said compartment, circuit connector means on said casing means electrically connected to said wiring, mechanical driving means in said casing means connected to said mechanism for drive thereof on projection operation, clutch means for said mechanical driving means having a driven element connected thereto and mounted at a fixed location on said casing means wall portion in an exteriorly accessible position, a base unit for removable support of said casing means thereon and having a wall portion for juxtaposition to said casing means wall portion when said casing means unit is mounted on said base unit in predetermined aligned manner, a driving element complementary to said driven element mounted at a fixed location on said base unit wall portion for automatic driving engagement of said driven element when said units are mounted together in the predetermined aligned manner for demountable structural connection therebetween, an A.C. motor mounted in said base unit, A.C. electrical wiring in said base unit electrically connected to said motor, means on said base unit electrically to connect the A.C. wiring of the latter to a household A.C. supply circuit as a source of power, connecting wiring means electrically connected to said base unit wiring having circuit connector means removably to be engaged with said first circuit connector means when said units are mounted together electrically to connect the A.C. wiring in said casing means to the power source, blower means carried by said base unit having an outlet duct terminating in an outlet opening in said base unit wall portion disconnectably connectable in flow communicating manner to the air inlet opening in said casing means wall portion when said units are mounted together in the predetermined aligned manner, and driving means connecting said A.C. motor to said driving element and said blower.

2. In a motion picture camera-projector apparatus adapted to handle unexposed film for taking pictures and developed film for projecting pictures, the combination comprising a manually portable camera-projector unit having casing means housing camera and projector film translating and shutter mechanism, said casing means having a wall portion, a power source housed in said casing means to drive said mechanism on camera operation, a ventilated compartment in said casing means to carry an A.C. light source for projection operation and having an air inlet opening in said casing means wall portion and an external air outlet, A.C. electrical wiring in said casing means leading to said compartment, circuit connector means on said casing means electrically connected to said wiring, mechanical driving means in said casing means connected to said mechanism for drive thereof on projection operation, clutch means for said mechanical driving means having a driven element connected thereto and mounted at a fixed location on said casing means wall portion in an exteriorly accessible position, a base unit for removable support of said casing means thereon and having a wall portion for juxtaposition to said casing means wall portion when said casing means unit is mounted on said base unit in predetermined aligned manner, a driving element complementary to said driven element mounted at a fixed location on said base unit wall portion for automatic driving engagement of said driven element when said units are mounted together in the predetermined aligned manner for demountable structural connection therebetween, an A.C. motor mounted in said base unit, A.C. electrical wiring in said base unit electrically connected to said motor, means on said base unit electrically to connect the A.C. wiring of the latter to a household A.C. supply circuit as a source of power, connecting wiring means electrically connected to said base unit wiring having circuit connector means removably to be engaged with said first circuit connector means when said units are mounted together electrically to connect the A.C. wiring in said casing means to the power source, blower means carried by said base unit having an outlet duct terminating in an outlet opening in said base unit wall portion disconnectably connectable in flow communicating manner to the air inlet opening in said casing means wall portion when said units are mounted together in the predetermined aligned manner, complementary engaging structure on said wall portions at the air inlet opening of said casing means and the blower outlet opening of said base unit for disconnectable interengagement for juxtaposed air flow connection therebetween serving as supplementary disengageable structural connection between said units, and driving means connecting said A.C. motor to said driving element and said blower.

3. In a motion picture camera-projector apparatus adapted to handle unexposed film for taking pictures and developed film for projecting pictures, the combination comprising a manually portable camera-projector unit having casing means housing camera and projector film translating and shutter mechanism, said casing means having a wall portion, a power source housed in said casing means to drive said mechanism on camera operation, a ventilated compartment in said casing means to carry an A.C. light source for projection operation and having an air inlet opening in said casing means wall portion and an external air outlet, A.C. electrical wiring in said casing means leading to said compartment, exteriorly accessible circuit connector means on said casing means wall portion electrically connected to said wiring, mechanical driving means in said casing means connected to said mechanism for drive thereof on projection operation, clutch means for said mechanical driving means having a driven element connected thereto and mounted at a fixed location on said casing means wall portion in an exteriorly accessible position, a base unit for removable support of said casing means thereon and having a wall portion for juxtaposition to said casing means wall portion when said casing means unit is mounted on said base unit in predetermined aligned manner, a driving element complementary to said driven element mounted at a fixed location on said base unit wall portion for automatic driving engagement of said driven element when said units are mounted together in the predetermined aligned manner for demountable structural connection therebetween, an A.C. motor mounted in said base unit, A.C. electrical wiring in said base unit electrically connected to said motor, means on said base unit electrically to connect the A.C. wiring of the latter to a houshold A.C. supply circuit as a source of power, connecting wiring means electrically connected to said base unit wiring having exteriorly accessible circuit connector means on said base unit wall portion removably to be engaged with said first circuit connector means when said units are mounted together electrically to connect the A.C. wiring in said casing means to the power source to serve as supplementary disengageable structural connection between said units when mounted together in predetermined aligned manner, blower means carried by said base unit having an outlet duct terminating in an outlet opening in said base unit wall portion disconnectably connectable in flow communicating manner to the air inlet opening in said casing means wall portion when said units are mounted together in the predetermined aligned manner, and driving means connecting said A.C. motor to said driving element and said blower.

4. In a camera-projector apparatus adapted to handle unexposed film on camera operation and developed film on projector operation, the combination comprising an encased camera-projector operating mechanism including a drive shaft, a casing for said mechanism, a battery-powered D.C. motor in said casing for drive of said mechanism on camera operation, said motor including a rotor mechanically connected to the drive shaft of said mechanism, switch means to control the D.C. operation of said motor, a shaft extension in said casing coupled to said drive shaft for drive of said mechanism on projector operation, a base unit for support of said casing in projector operation, an A.C. motor in said base unit to be powered by household A.C. supply, said shaft extension having an exteriorly accessible portion at a fixed location on the bottom of said encased mechanism, an A.C. motor-driven shaft in said base unit and having an exteriorly accessible portion at a fixed location on the top of said base unit, disengageable coupling means to couple together said exteriorly accessible portions of said A.C. motor-driven shaft and shaft extension upon mount of said casing upon said base unit in properly aligned relation, a ventilated compartment in said casing for housing an A.C. projector light source, a blower housed in said base unit and operated by said A.C. motor, disengageable duct means to connect said blower to said light source compartment when said casing is demountably mounted on said base unit in the properly aligned relation with interengagement of said coupling means, A.C. branch circuit means having a pair of conductors connected in parallel with said A.C. motor and terminating in electrical plug-in connector means located externally of said base unit, said casing having an opening therein for reception of said connector means, mating electrical connector means in said casing at said opening and A.C. wiring in said casing leading from said mating connector means to said light source compartment for supply thereto of A.C. power when said connector means are interengaged.

5. In a camera-projector apparatus adapted to handle unexposed film on camera operation and developed film on projector operation, the combination comprising an encased camera-projector film translating and shutter operating mechanism, a casing housing said mechanism and having a ventilated projector light source compartment therein and a bottom wall, a horizontal main drive shaft in said casing for said mechanism, a battery-powered D.C. motor in said casing for drive of said main drive shaft when in camera operation, switch means on said casing to control the D.C. operation of said motor, a vertical shaft extending upwardly from the bottom wall of said casing and having coupling means at its bottom end exposed at a fixed location through the casing bottom wall, means coupling said vertical shaft to said main drive shaft to drive it on projector operation, a base unit for support of said casing in projector operation and having a top wall, driving coupling means exposed at a fixed location through the top wall to be directly coupled mechanically to the vertical shaft coupling means when said casing is supported in properly aligned relation on said base unit, an A.C. fan motor in said base unit to be powered by household A.C. supply, driving means connecting said base unit coupling means to said A.C. fan motor, a fan in said base unit mechanically connected to said motor, and disengageable duct means extending between said fan and said light source compartment when said casing is mounted in the properly aligned coupling engaged relation on said base unit to pass currents of cooling air from said fan to said light source compartment.

References Cited in the file of this patent
UNITED STATES PATENTS

| | | |
|---|---|---|
| 1,272,798 | Green | July 16, 1918 |
| 1,295,081 | Tartara | Feb. 18, 1919 |
| 1,851,912 | Kingston | Mar. 29, 1932 |
| 1,919,595 | Owens | July 25, 1933 |
| 2,093,832 | Fordyce | Sept. 21, 1937 |
| 2,148,493 | Nowland | Feb. 28, 1939 |
| 2,160,890 | Mulch | June 6, 1939 |
| 2,259,340 | Giroux | Oct. 14, 1941 |
| 2,493,636 | Mills | Jan. 3, 1950 |

UNITED STATES PATENT OFFICE

CERTIFICATE OF CORRECTION

Patent No. 2,943,535   July 5, 1960

John W. Oxberry

It is hereby certified that error appears in the printed specification of the above numbered patent requiring correction and that the said Letters Patent should read as corrected below.

Column 2, line 67, for "jector" read -- projector --; column 7, line 61, for "is biasing" read -- its biasing --; column 11, line 5, after "73" insert -- and --; column 14, line 46, for "Serial No. 718,465" read -- Serial No. 718,365--.

Signed and sealed this 13th day of December 1960.

(SEAL)
Attest:
KARL H. AXLINE
Attesting Officer

ROBERT C. WATSON
Commissioner of Patents